(12) United States Patent
Zembutsu et al.

(10) Patent No.: US 10,719,348 B2
(45) Date of Patent: Jul. 21, 2020

(54) NETWORK FUNCTION VIRTUALIZATION MANAGEMENT AND ORCHESTRATION APPARATUS, METHOD, AND PROGRAM

(71) Applicant: NEC CORPORATION, Tokyo (JP)

(72) Inventors: Hajime Zembutsu, Tokyo (JP); Yuki Miyata, Tokyo (JP); Yuki Yoshimura, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 153 days.

(21) Appl. No.: 16/079,249

(22) PCT Filed: Apr. 27, 2017

(86) PCT No.: PCT/JP2017/016763
§ 371 (c)(1),
(2) Date: Aug. 23, 2018

(87) PCT Pub. No.: WO2017/188387
PCT Pub. Date: Nov. 2, 2017

(65) Prior Publication Data
US 2019/0065234 A1 Feb. 28, 2019

(30) Foreign Application Priority Data
Apr. 28, 2016 (JP) .................. 2016-090735

(51) Int. Cl.
*G06F 9/455* (2018.01)
*G06F 9/50* (2006.01)
(Continued)

(52) U.S. Cl.
CPC .......... *G06F 9/45558* (2013.01); *G06F 9/46* (2013.01); *G06F 9/50* (2013.01); *G06F 9/5077* (2013.01);
(Continued)

(58) Field of Classification Search
CPC .......... G06F 9/45558; G06F 9/46; G06F 9/50; G06F 9/5077; G06F 2009/45595; G06F 2009/4557; H04L 47/82
See application file for complete search history.

(56) References Cited

U.S. PATENT DOCUMENTS 10,116,571 B1 * 10/2018 Bertz ................. H04L 67/38
2016/0127169 A1 * 5/2016 Rosa de Sousa Teixeira ..............
H04L 41/5025
370/216
(Continued)

FOREIGN PATENT DOCUMENTS

| EP | 2940968 A1 | 11/2015 |
| JP | 2015-194949 A | 11/2015 |
| WO | 2016048430 A1 | 3/2016 |

OTHER PUBLICATIONS

Wenyu Shen et al., "v Conductor: An Enabler for Achieving Virtual Network Integration as a Service", IEEE Communications Magazine 53.2, Feb. 2015, pp. 116-124.
(Continued)

*Primary Examiner* — Adam Lee
(74) *Attorney, Agent, or Firm* — Sughrue Mion, PLLC (57) ABSTRACT

A network function virtualization management and orchestration apparatus includes a VIM(s) and an upper entity(ies) of the VIM(s). The VIM(s) performs resource management and control of an NFVI(s) that provides an execution infrastructure(s) for a VNF(s) implemented and virtualized by software that operates on a virtual machine(s). The upper entity(ies) collects resource information about the NFVI(s) from the VIM(s) and determines a virtual machine allocation destination(s) based on the collected resource information about the NFVI(s). The VIM(s) generates a virtual machine(s) at the determined virtual machine allocation destination(s).

10 Claims, 9 Drawing Sheets

(51) Int. Cl.
*G06F 9/46* (2006.01)
*H04L 12/911* (2013.01)

(52) U.S. Cl.
CPC ...... *H04L 47/82* (2013.01); *G06F 2009/4557* (2013.01); *G06F 2009/45595* (2013.01)

(56) References Cited

U.S. PATENT DOCUMENTS

| | | | |
|---|---|---|---|
| 2016/0321112 A1* | 11/2016 | Iwashina | H04L 47/78 |
| 2016/0328258 A1* | 11/2016 | Iwashina | H04L 47/70 |
| 2017/0150399 A1* | 5/2017 | Kedalagudde | H04L 41/0896 |
| 2017/0220371 A1* | 8/2017 | Kosugi | H04W 24/04 |
| 2017/0346676 A1* | 11/2017 | Andrianov | H04L 41/0631 |
| 2018/0032362 A1* | 2/2018 | Buil | G06F 9/4856 |
| 2018/0131557 A1* | 5/2018 | Chou | G06F 9/45558 |
| 2018/0206108 A1* | 7/2018 | Chou | H04W 28/08 |

OTHER PUBLICATIONS

Roberto Riggio et al., "Virtual Network Functions Orchestration in Enterprise WLANs", IFIP/IEEE International Symposium, 2015, pp. 1220-1225.
ETSI GS NFV-MAN 001 V1.1.1 (Dec. 2014) Network Functions Virtualisation (NFV); Management and Orchestration (searched on Apr. 12, 2016) http://www.etsi.org/deliver/etsi_gs/NFV-MAN/001_099/001/01.01.01_60/gs_NFV-MAN001v010101p.pdf, Dec. 2014.
International Search Report for PCT/JP2017/016763 dated Jul. 18, 2017 [PCT/ISA/210].
Communication dated Mar. 21, 2019 from the European Patent Office in application No. 17789669.3.
Shen, W., et al., "vConductor: An NFV Management Solution for Realizing End-to-End Virtual Network Services", The 16th Asia-Pacific Network Operations and Management Symposium, IEEE, 2014, XP032713791, 6 pages.

* cited by examiner

NETWORK FUNCTION VIRTUALIZATION MANAGEMENT AND ORCHESTRATION APPARATUS, METHOD, AND PROGRAM

REFERENCE TO RELATED APPLICATION

This application is a National Stage of International Application No. PCT/JP2017/016763 filed Apr. 27, 2017 and claims the benefit of the priority of Japanese patent application No. 2016-090735, filed on Apr. 28, 2016, the disclosure of which is incorporated herein in its entirety by reference thereto.

TECHNICAL FIELD

The present invention relates to a network function virtualization management and orchestration apparatus, a method, and a program.

BACKGROUND

There is known network functions virtualization (NFV) in which a function(s) of a network apparatus(es) and the like is realized as software by using a virtual machine(s) (VM(s)) implemented on a virtualization layer(s) such as a hypervisor(s) (HV(s)) on a server(s).

The European Telecommunications Standards Institute (ETSI) has been advancing a discussion on common requirements, etc. in network virtualization. At the time of filing the application, the discussion by the ETSI has completed phase 1, and now, phase 2 is underway. The result of phase 1 has been made public as literatures including NPL (Non Patent Literature) 1.

Figure 9:
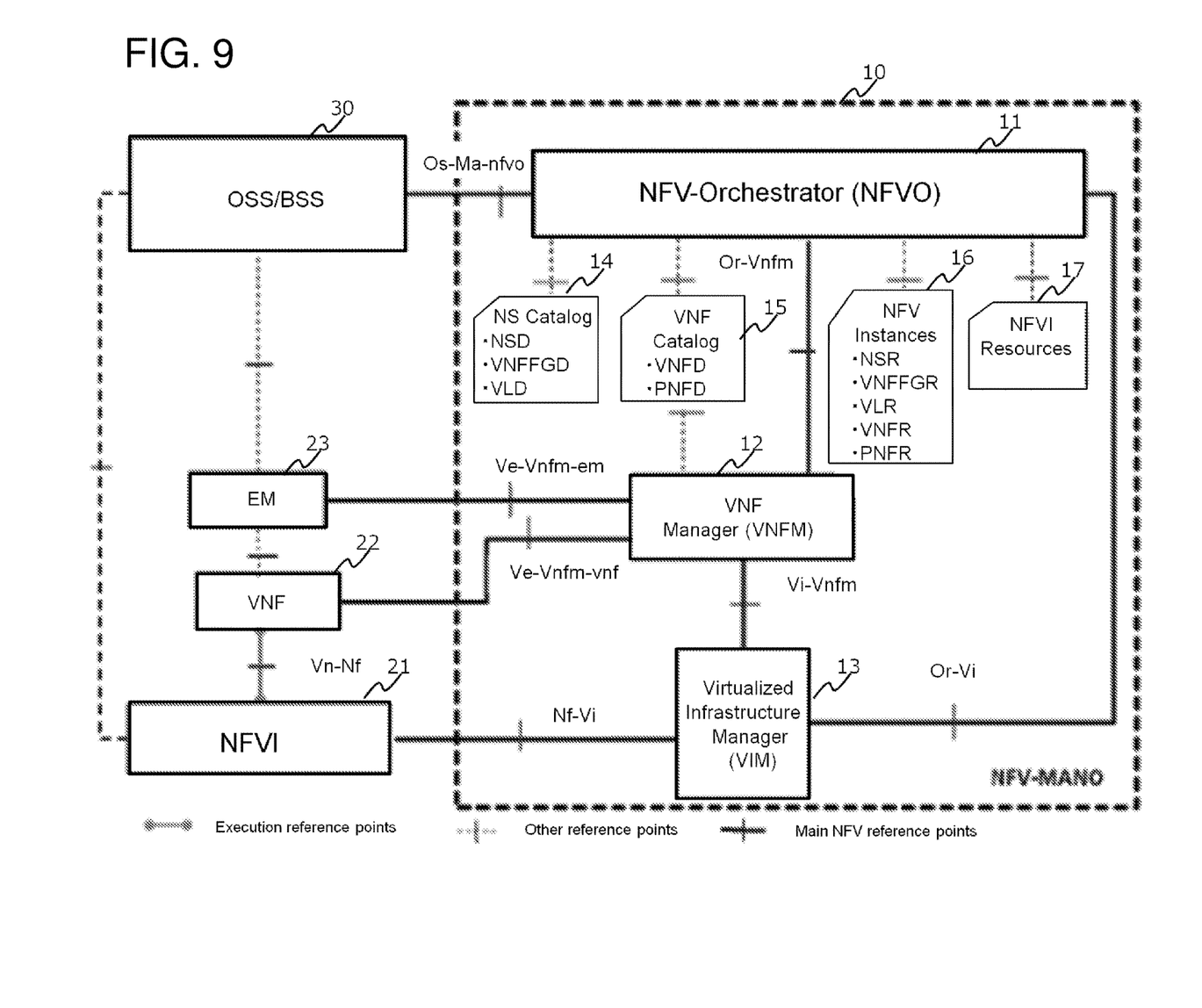
FIG. 9 is a drawing cited from FIG. 5.1 on page 23 in NPL 1.

FIG. 9 is a drawing cited from FIG. 5.1 (The NFV-MANO architectural framework with reference points) on page 23 in NPL 1.

An individual virtualized network function (VNF) 22 corresponds to an application or the like that operates on a virtual machine (VM) on a server and realizes a network function as software. A management function referred to as an element manager (EM) 23 (also referred to as an element manage system (EMS)) is arranged per VNF 22. A network functions virtualization infrastructure (NFVI) 21 is an infrastructure where hardware resources of physical machines (servers) such as for computing, storage, and network functions are virtualized in virtualization layers such as hypervisors to be flexibly used as virtualized hardware resources such as for virtual computing, virtual storage, and virtual networks.

An NFV orchestrator (NFVO) 11 of an NFV management & orchestration (NFV-MANO) 10 performs orchestration of resources of the NFVI 21 and lifecycle management of network service (NS) instances (instantiation, scaling, termination, update, etc. of NS instances). In addition, the NFVO 11 manages an NS catalog 14 (NSD/VLD/VNFFGD) and a VNF catalog 15 (VNFD(VNF/PNFD)) and has an NFV instances repository 16 and an NFVI resources repository 17.

A VNF manager (VNFM) 12 performs lifecycle management of VNF instances (for example, instantiation, update, query, scaling, termination, etc.) and event notification.

A virtualized infrastructure manager (VIM) 13 manages computing, storage, and network resources of the NFVI 21, monitors a failure of the NFVI 21, and monitors resources of the NFVI 21, for example.

"Operations service systems (OSS)" of an OSS/BSS 30 is a general term for systems (apparatuses, software, mechanisms, etc.) needed by, for example, telecommunication carriers (carriers) to establish and operate services. "Business support systems (BSS)" is a general term for information systems (apparatuses, software, mechanisms, etc.) needed by, for example, telecommunication carriers (carriers) to use for charging usage fees or the like, billing, customer care, etc.

The NS catalog 14 represents the repository of network services (NSs). The NS catalog supports the generation and management of network service (NS) deployment templates (a network service descriptor (NSD), virtual link descriptor (VLD), and VNF forwarding graph descriptor (VNFFGD).

The VNF catalog 15 represents the repository of on-boarded VNF packages, for example. The VNF catalog 15 has a VNF descriptor (VNFD), PNF descriptor (PNFD), etc.

The NFV instances repository 16 holds information about all VNF instances and network service (NS) instances. The VNF instance and the NS instance are described in VNF and NS records, respectively. These records are updated during the lifecycles of the respective instances, reflecting execution results of VNF lifecycle management operations and/or NS lifecycle management operations.

The NFVI Resources Repository 17 holds information about available/reserved/allocated resources of the NFVI 21, the information abstracted by the VIM 13, and provides useful information, for example, for reservation, allocation, and monitoring of resources. The NFVI resources repository 17 is important, for example, in the resource orchestration of the NFVO 11, since the NFVI resources repository 17 can track the reserved/allocated resources of the NFVI 21 against the NS and VNF instances associated with these resources (e.g., the number of virtual machines used by a target VNF 22 at any time during its lifecycle).

In FIG. 9, a reference point Os-Ma-nfvo is a reference point between the OSS/BSS 30 and the NFVO 11 and is used, for example, for:
  network service lifecycle management,
  a VNF lifecycle management request, and
  forwarding of NFV-related state information and exchange of policy management information.
  A reference point Vi-Vnfm is used for:
  a resource allocation request from the VNFM 12 to the VIM 13, and
  exchange of configuration and state information about virtualized resources.
  A reference point Ve-Vnfm-em is used between the EMS 23 and the VNFM 12, for example, for:
  VNF instantiation, VNF instance query, update, termination, scaling out/in, scaling up/down, and
  configuring VNFM12 form EM (EMS) 23, forwarding of an event and notification of a VNF configuration from the VNFM 12 to the VNF 22 or an event.
  A reference point Ve-Vnfm-vnf is used between the VNF 22 and the VNFM 12, for example, for:
  VNF instantiation, VNF instance query, update, termination, scaling out/in, scaling up/down, configuring the VNFM from the VNF, forwarding of an event, and notification of a VNF configuration from the VNFM 12 to the VNF 22 or an event.
  For example, in addition to instructions about computing/storage resources, a reference point Nf-Vi is used for allocation of virtualized resources to a resource allocation request, forwarding of state information about virtualized resources, and exchange of configuration and state information about hardware resources, such as allocation of a virtual machine (VM), update of VM resource allocation, VM migration, VM termination, and generation/removal of connection between VMs.

A reference point Vn-Nf represents execution environment provided by the NFVI 21 to the VNF 22.

A reference point Or-Vnfm is used for:

resource-related requests by the VNFM 12 (authorization, reservation, allocation, etc.), forwarding of configuration information to the VNFM 12, and collection of VNF state information.

A reference point Or-Vi is used for:

a resource reservation request from the NFVO 11 to the VIM 13 (reserve resource request), a resource allocation request (allocate resource request), and exchange of configuration and state information about virtualized resources (see NPL 1 for the details).

The network service descriptor (NSD) of the NS catalog 14 is a network service deployment template and has an entity that defines network function scripts/workflows of specific lifecycle events (instantiation, termination, scaling, etc.).

The VNFFGD (VNF Forwarding Graph Descriptor) is a deployment template which describes a network service topology or a part thereof by referring to VNFs, PNFs, or virtual links connecting these VNFs and PNFs.

The Virtual Link Descriptor (VLD) is a deployment template which describes the resource requests that are needed for a link between VNFs, PNFs, and NS endpoints available in the NFVI 21.

The VNF Descriptor (VNFD) of the VNF catalog 15 is a deployment template which describes a VNF in terms of its deployment and operational behavior requirements. The VNFD is primarily used by the VNFM 12 in the process of VNF instantiation and lifecycle management of a VNF instance. The VNFD is used by the NFVO 11 to manage and orchestrate network services and virtualized resources on the NFVI 21 (computer system/middleware/service deployment/setting/management automation). The VNFD also contains connectivity, interface, and Key Performance Indicators (KPI) requirements that can be used by the NFVO 11 to establish virtual links between VNFC instances of the NFVI 21 or between a VNF instance and an endpoint of another network function.

The Physical Network Function Descriptor (PNFD) of the VNF catalog 15 describes the connectivity, interface, KPIs requirements of virtual links to an attached physical network function. This is needed if a physical device is incorporated in an NS and facilitates network expansion.

The OSS/BSS 30 or the VNFM 12 performs NS or VNF instantiation operations on the NFVO 11. As a result of the instantiation operations, records representing newly generated instances are generated. For example, the records generated based on the information given in the individual descriptors and additional runtime information related to the component instances provide data to model the network service (NS) instance states. Examples of the generated instance records include:

network service record (NSR),
VNFFG record (VNFFGR),
virtual link record (VLR),
virtualized network function record (VNFR), and
physical network function record (PNFR).

The NSR, VNFR, VNFFGR, VLR information elements provide a collection of data items that are needed to model the states of instances of an NS, VNF, VNFFG, and VL. The PNF record forms a part of an NS, represents an instance relating to a PNF that has pre-existed, and includes runtime attributes regarding PNF information (connectivity relevant to the NFVO).

NPL 1: ETSI GS NFV-MAN 001 V1.1.1 (2014-12) Network Functions Virtualisation (NFV); Management and Orchestration (searched on Apr. 12, 2016)

SUMMARY

The disclosure of the above Citation List is incorporated herein by reference thereto. The following analysis has been made by the present inventors.

According to the NFV standard architecture based on phase 1, the individual VIMs 13 are responsible for allocation of virtual machines (VMs). In many cases, the VIMs 13 are currently implemented based on OpenStack, however, these VIMs 13 based on OpenStack cannot realize the allocation of the virtual machines (VMs). Thus, in Open Platform for NFV (OPNFV) that implements open source NFV, a Promise WG has been discussing to allow an individual VIM 13 to include an optimum allocation logic for virtual machines (VMs). However, at this moment, whether this function will be incorporated is uncertain.

Thus, under the current circumstances, the functions of an individual VIM 13 requested by the NFV standard architecture have not been realized by an individual VIM 13 implemented based on OpenStack. Thus, when a virtual machine (VM) needs to be generated when a VNF lifecycle is executed, the VNFM 12 not only sends a virtual machine (VM) generation request to a corresponding VIM 13 but also notifies the VIM 13 of allocation rules applied when the virtual machine (VM) is generated (selection of an availability zone (AZ), selection of a physical machine (PM), designation of an anti-affinity rule, designation of a different host filter, etc.). Namely, at the time of filing the application, an individual VIM 13 based on OpenStack does not support a function of optimum allocation of virtual machines (VMs). Instead, by sending virtual machine (VM) allocation rules applied when a virtual machine (VM) is generated to the VIM 13, the VNFM 12 indirectly designates a virtual machine (VM) allocation destination. Thus, in some cases, a virtual machine (VM) could be allocated at an allocation destination not intended by the NFVO 11 or the VNFM 12.

It is an object of the present invention to provide a network function virtualization management and orchestration apparatus, a method, and a program that contribute to enabling optimum allocation of a virtual machine(s) while using a VIM(s) that does not have a virtual machine (VM) allocation destination determination function.

According to a first aspect of the present invention, there is provided a network function virtualization management and orchestration apparatus, including: a virtualized infrastructure manager(s) (VIM(s)) which performs resource management and control of a network function virtualization infrastructure(s) (NFVI(s)) that provides an execution infrastructure(s) for a virtual network function(s) (a VNF(s)) implemented and virtualized by software that operates on a virtual machine(s); and an upper entity(ies) of the VIM(s), wherein the upper entity(ies) collects resource information about the NFVI(s) from the VIM(s) and determines a virtual machine allocation destination(s) based on the collected resource information about the NFVI(s), and wherein the VIM(s) generates a virtual machine(s) at the determined virtual machine allocation destination(s).

According to a second aspect of the present invention, there is provided a network function virtualization management and orchestration method performed in a network function virtualization management and orchestration apparatus, including a virtualized infrastructure manager(s) (VIM(s)) which performs resource management and control of a network function virtualization infrastructure(s) (NFVI(s)) that provides an execution infrastructure(s) for a virtual network function(s) (a VNF(s)) implemented and virtualized by software that operates on a virtual machine(s), the method comprising: collecting resource information about the NFVI(s) from the VIM(s); determining a virtual machine allocation destination(s) based on the collected resource information about the NFVI(s); and generating a virtual machine(s) at the determined virtual machine allocation destination(s).

According to a third aspect of the present invention, there is provided a program, causing a computer in a network function virtualization management and orchestration apparatus, including a virtualized infrastructure manager(s) (VIM(s)) which performs resource management and control of a network function virtualization infrastructure(s) (NFVI(s)) that provides an execution infrastructure(s) for a virtual network function(s) (a VNF(s)) implemented and virtualized by software that operates on a virtual machine(s), to perform processing for: collecting resource information about the NFVI(s) from the VIM(s); determining a virtual machine allocation destination(s) based on the collected resource information about the NFVI(s); and generating a virtual machine(s) at the determined virtual machine allocation destination(s).

This program can be recorded in a computer-readable storage medium. The storage medium may be a non-transient storage medium such as a semiconductor memory, a hard disk, a magnetic storage medium, or an optical storage medium. The present invention can be embodied as a computer program product.

According to the aspects of the present invention, there are provided a network function virtualization management and orchestration apparatus, a method, and a program that contribute to enabling optimum allocation of a virtual machine(s) while using a VIM(s) that does not have a virtual machine (VM) allocation destination determination function.

PREFERRED MODES

First, an outline of an exemplary embodiment will be described. Reference characters in the following outline denote various elements for the sake of convenience and are used as examples to facilitate understanding of the present invention. The description of the following outline is not intended to impose any limitations.

Figure 1:
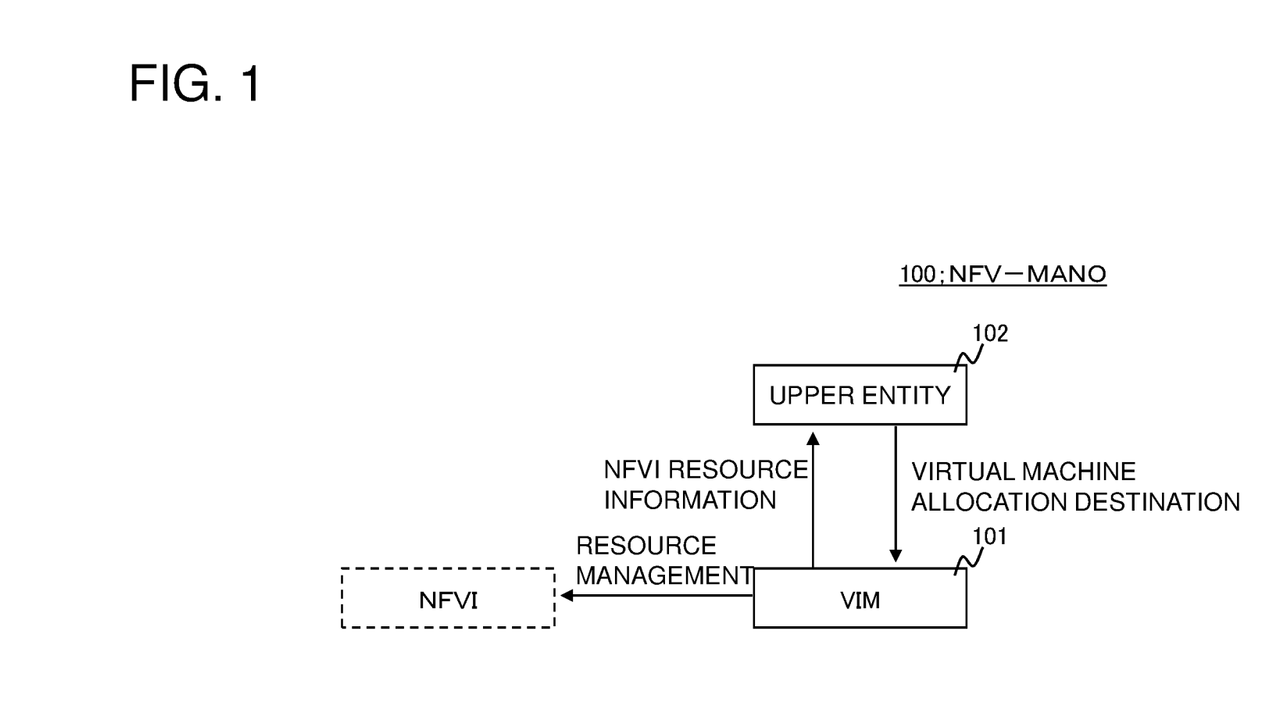
FIG. 1 illustrates an outline of an exemplary embodiment.

A network function virtualization management and orchestration apparatus (NFV-MANO) 100 according to an exemplary embodiment includes a VIM 101 and an upper entity 102 of the VIM 101. The VIM 101 performs resource management and control of a network function virtualization infrastructure (NFVI) that provides an execution infrastructure for a virtual network function (VNF) implemented and virtualized by software that operates on a virtual machine. The upper entity 102 collects resource information about the NFVI from the VIM 101 and determines a virtual machine allocation destination based on the collected resource information about the NFVI. The VIM 101 generates a virtual machine at the determined virtual machine allocation destination.

The network function virtualization management and orchestration apparatus (NFV-MANO) 100 according to an exemplary embodiment has the NFV architecture as illustrated in FIG. 1. Namely, the upper entity (an upper node; for example, an NFVO or a VNFM) of the VIM 101 has a leading role in determining a virtual machine (VM) allocation destination in view of the resource information about the NFVI. As a result, in a network system to which NFV is applied, it is possible to realize optimization of a virtual machine (VM) while using a VIM that does not have a virtual machine (VM) allocation destination determination function.

Hereinafter, specific exemplary embodiments will be described in more detail with reference to the drawings. Like components will be denoted by like reference characters, and description thereof will be omitted.

First Exemplary Embodiment

A first exemplary embodiment will be described in more detail with reference to drawings.

Figure 2:
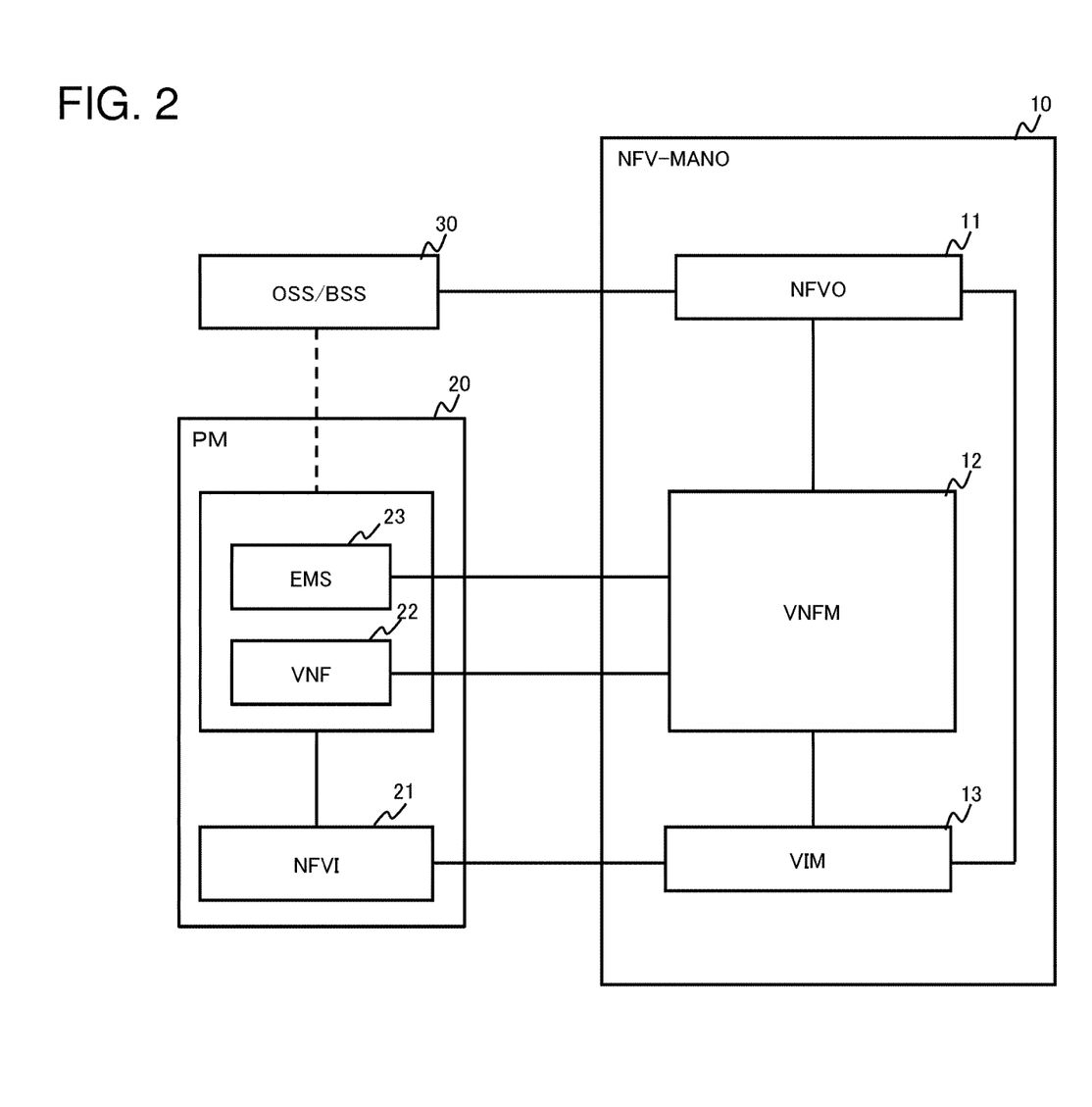
FIG. 2 illustrates an example of a configuration of a network system according to a first exemplary embodiment.

FIG. 2 illustrates an example of a configuration of a network system according to the first exemplary embodiment. As illustrated in FIG. 2, the network system includes a network function virtualization management and orchestration apparatus (NFV-MANO) 10 including an NFV orchestrator (NFVO) 11, a VNF manager (VNFM) 12, and a virtualized infrastructure manager (VIM) 13.

Each of the NFVO 11, the VNFM 12, and the VIM 13 is a functional entity that manages a network system. The VIM 13 is an entity that generates a virtual machine(s) (VM(s)) and a VNF(s) on a physical machine(s) (PM(s)) under control of the NFVO 11 and the VNFM 12, which function as upper entities of the VIM 13.

In addition, the network system includes a physical machine (PM) 20 and an OSS/BSS 30. The physical machine 20 includes an NFVI 21, and a VNF 22 and an EMS 23 are configured on the NFVI 21. The network system illustrated in FIG. 2 provides a communication function by using a virtual server (the VNF 22) realized as software by a virtual machine(s) (VM(s)) configured on the physical machine 20. While FIG. 2 illustrates a single physical machine 20, a plurality of physical machines 20 are actually included in the network system.

Figure 3:
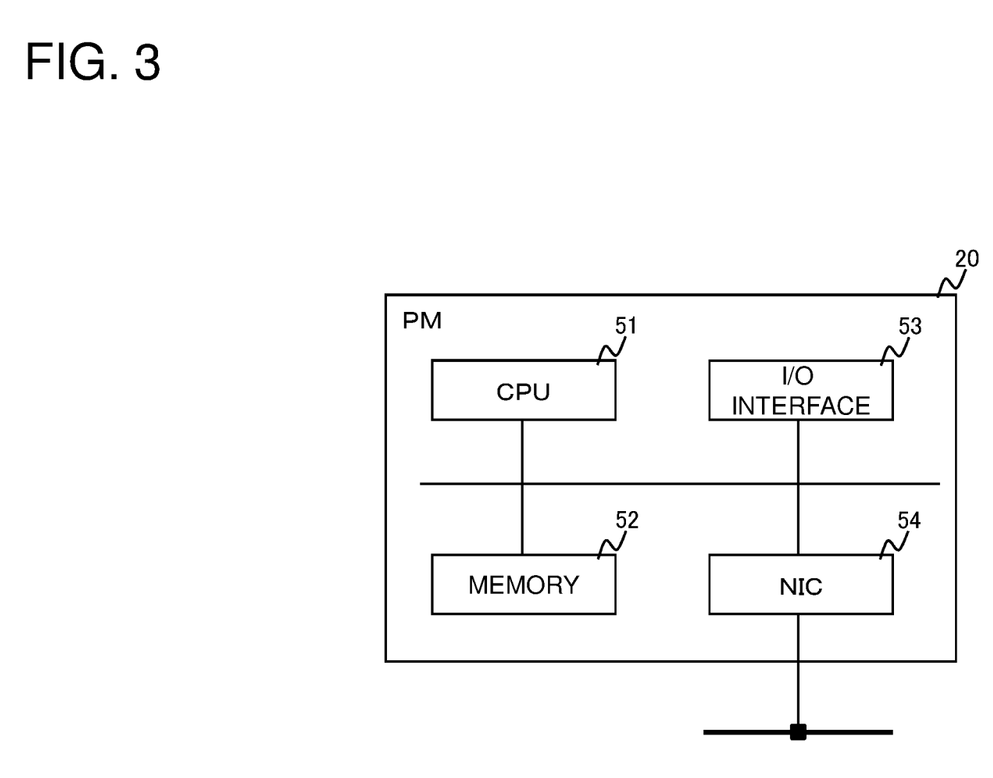
FIG. 3 is a block diagram illustrating an example of a hardware configuration of a physical machine (PM) according to the first exemplary embodiment.

FIG. 3 is a block diagram illustrating an example of a hardware configuration of the physical machine 20 according to the first exemplary embodiment. The physical machine 20 is a so-called information processing apparatus (a computer) and has a configuration illustrated as an example in FIG. 3. For example, the physical machine includes a central processing unit (CPU) 51, a memory 52, input/output (I/O) interface 53, a network interface card (NIC) 54 as a communication means, etc., which are mutually connected via an internal bus.

The hardware configuration of the physical machine 20 is not limited to the configuration illustrated in FIG. 3. The physical machine 20 may include other hardware components that are not illustrated in FIG. 3. For example, the number of CPUs included in the physical machine 20 is not limited to the example illustrated in FIG. 3. For example, a plurality of CPUs may be included in the physical machine 20.

The memory 52 is a random access memory (RAM), a read-only memory (ROM), or an auxiliary storage device (a hard disk or the like). The I/O interface 53 is means for serving as an interface for a display apparatus or an input apparatus that are not illustrated. For example, the display apparatus is a liquid crystal display or the like. For example, the input apparatus is an apparatus that receives user operations via a keyboard, a mouse, or the like.

Other server apparatuses that form the NFVO 11, the VNFM 12, the VIM 13, and the OSS/BSS 30 have basically the same hardware configuration as that of the physical machine 20. Thus, since the configurations are clear to those skilled in the art, description thereof will be omitted.

Figure 4:
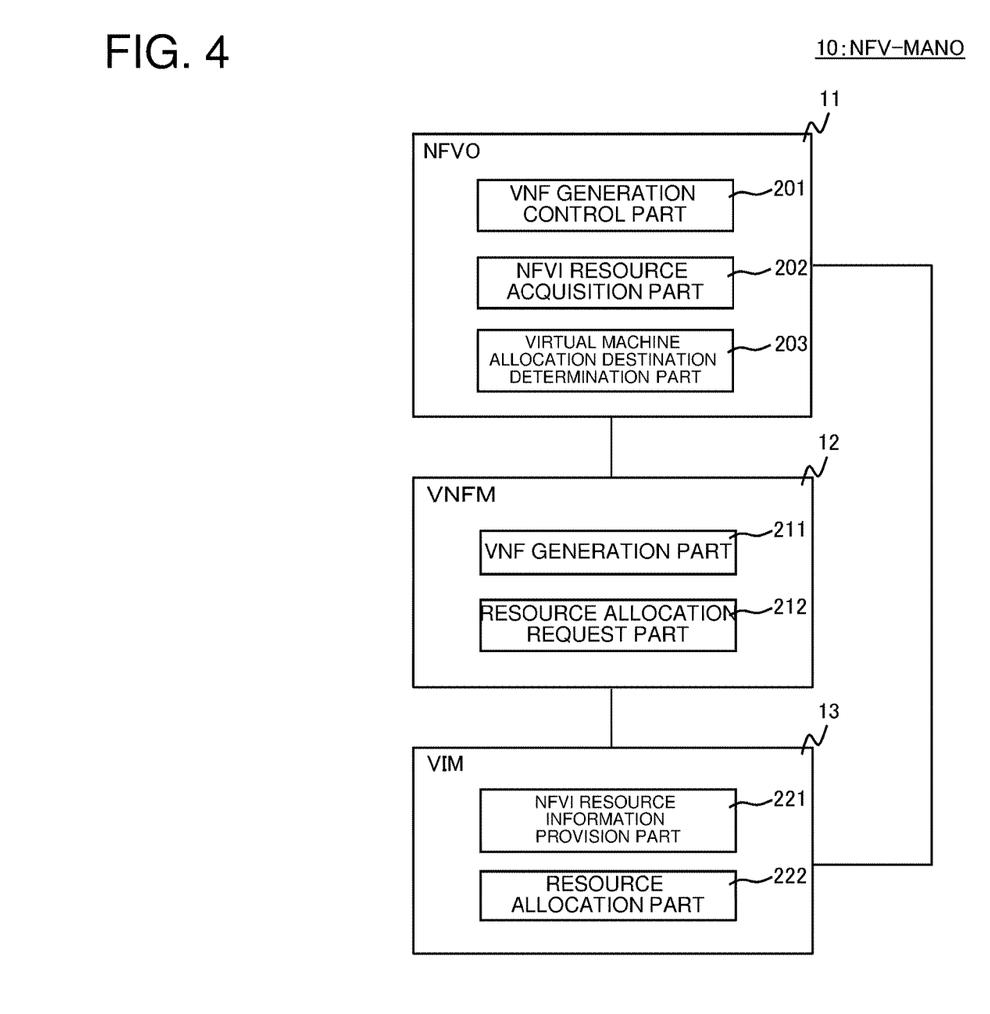
FIG. 4 illustrates functions of an NFV-MANO according to the first exemplary embodiment.

FIG. 4 illustrates functions of the NFV-MANO 10 according to the first exemplary embodiment.

As illustrated in FIG. 4, the NFVO 11, a VNF generation control part 201, an NFVI resource acquisition part 202, and a virtual machine allocation destination determination part 203.

The VNF generation control part 201 is means responsible for control relating to generation of VNFs. Specifically, the VNF generation control part 201 receives a request relating to generation of a VNF from a source (a sender; a maintenance person or an upper apparatus). When receiving this request, the VNF generation control part 201 requests the VNFM 12 to generate a VNF.

The NFVI resource acquisition part 202 is means for acquiring NFVI resource information. Specifically, the NFVI resource acquisition part 202 requests the VIM 13 to provide NFVI resource information. The NFVI resource acquisition part 202 acquires, as the NFVI resource information, availability zone (AZ) resource information or PM resource information from the VIM 13. The AZ resource information includes information about a PM forming an availability zone. The PM resource information includes information about a virtual machine(s) (VM(s)) that has already been deployed at a physical machine.

The virtual machine allocation destination determination part 203 is means for determining virtual machine (VM) allocation destinations based on the NFVI resource information acquired (collected) from the VIM 13. Specifically, based on the NFVI resource information, the virtual machine allocation destination determination part 203 determines virtual machine (VM) allocation destinations so that virtual machines are concentrically allocated in a single zone (AZ) or physical machine (PM) or dispersedly allocated in zones or physical machines (PMs). The virtual machine allocation destination determination part 203 may determine the virtual machine (VM) allocation destinations (determine optimum allocation of VMs) in a different method other than the above methods.

The virtual machine allocation destination determination part 203 notifies the VNFM 12 of a virtual machine (VM) allocation destination that has been determined. Specifically, when the virtual machine allocation destination determination part 203 sends a reply (VNF generation permission) to a VNF generation permission request from the VNFM 12, the virtual machine allocation destination determination part 203 designates a virtual machine allocation destination by including an identifier (which will hereinafter be referred to as a VM allocation destination identifier (ID)) designating the virtual machine allocation destination in a parameter in the reply. It is desirable that an identifier that can be used in the current OpenStack, such as an AZ ID or a hostname, be used as the VM allocation destination ID designating the virtual machine (VM) allocation destination.

The VNFM 12 includes a VNF generation part 211 and a resource allocation request part 212.

The VNF generation part 211 is means for generating VNFs 22 in physical machines 20. Specifically, when receiving a request relating to generation of a VNF from the NFVO 11, the VNF generation part 211 sends a VNF generation permission request to the NFVO 11. In addition, when receiving a reply indicating that resources of a virtual machine (VM) have been allocated from the VIM 13, the VNF generation part 211 generates a VNF 22 in a physical machine 20 corresponding to the VM allocation destination ID (performs settings needed for allocation of a VNF).

The resource allocation request part 212 is means for sending an NFVI resource allocation request (Allocate Resources) to the VIM 13. In this operation, the resource allocation request part 212 sends a resource allocation request including the VM allocation destination ID acquired from the NFVO 11 to the VIM 13.

The VIM 13 includes an NFVI resource information provision part 221 and a resource allocation part 222.

The NFVI resource information provision part 221 is means for processing a request relating to provision of the NFVI resource information from the NFVO 11. Specifically, when receiving the above request from the NFVO 11, the NFVI resource information provision part 221 includes NFVI resource information managed thereby in a reply to the request.

The resource allocation part 222 is means for processing a resource allocation request from the VNFM 12. Specifically, the resource allocation part 222 generates and starts network resources relating to a designated virtual machine (VM) in a physical machine corresponding to the "VM allocation destination ID" included in a resource allocation request acquired from the VNFM 12. Upon completion of the allocation of the resources, the resource allocation part 222 sends a reply to the VNFM 12, the reply indicating that a virtual machine (VM) has been allocated based on the VM allocation destination ID.

Figure 5:
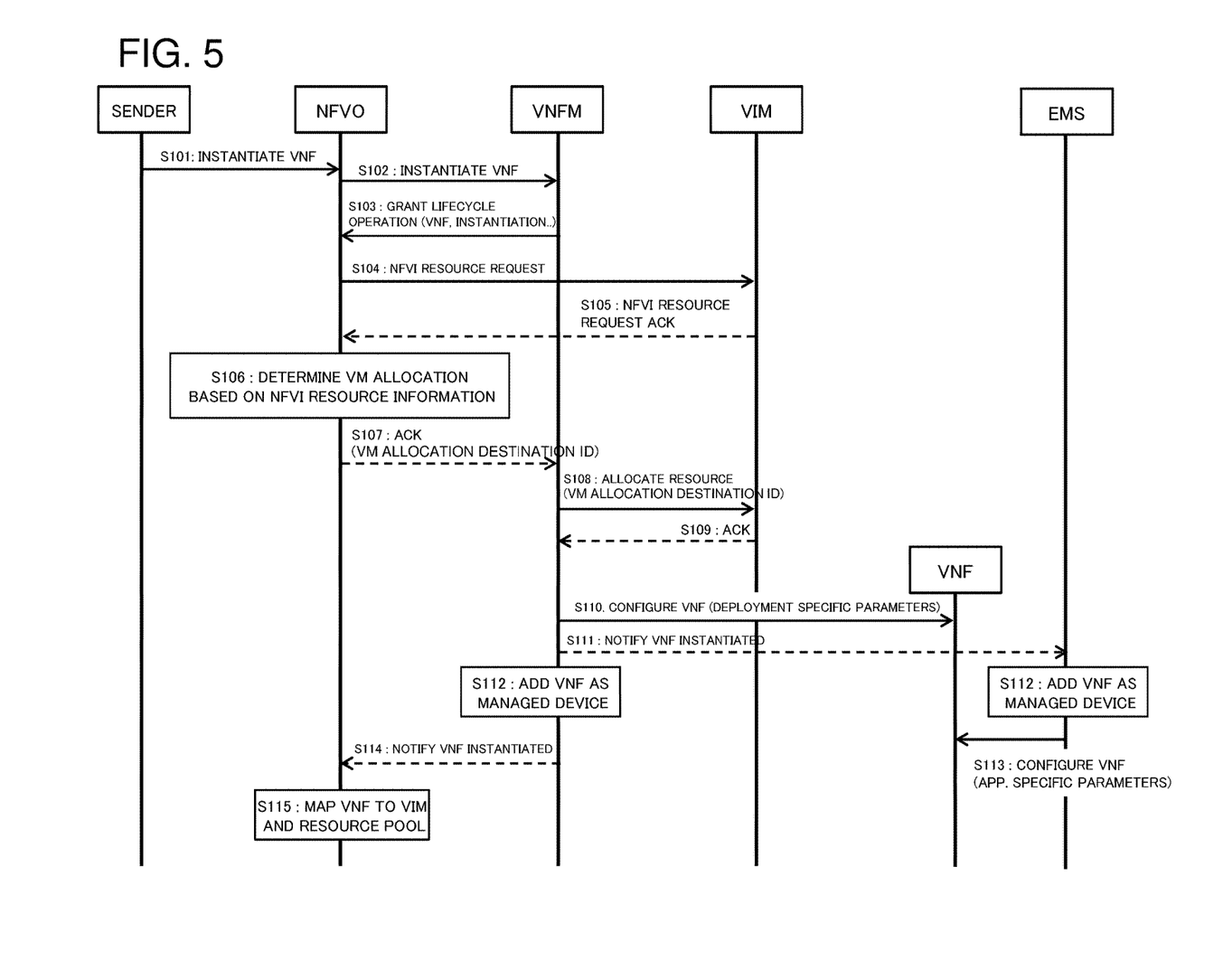
FIG. 5 is a sequence diagram illustrating an example of an operation of the network system according to the first exemplary embodiment.

Next, an operation of the network system according to the first exemplary embodiment will be described with reference to a drawing. FIG. 5 is a sequence diagram illustrating an example of an operation of the network system according to the first exemplary embodiment. An operation of VM allocation performed when a VNF is instantiated in its VNF lifecycle will be described with reference to FIG. 5.

In step S101, a sender (a maintenance person or an upper apparatus) instructs the NFVO 11 to generate a VNF.

In step S102, when receiving the instruction, the NFVO 11 sends an instruction (a request) relating to generation of a VNF to the VNFM 12.

In step S103, the VNFM 12 sends a VNF generation permission request to the NFVO 11. Specifically, the VNFM 12 uses a grant lifecycle operation to designate a VNF and request the NFVO 11 to grant the instantiation of the VNF.

In step S104, the NFVO 11 requests the VIM 13 to send NFVI resource information.

In step S105, by replying to the request from the NFVO 11, the VIM 13 sends NFVI resource information managed thereby to the NFVO 11.

In step S106, the NFVO 11 determines a virtual machine (VM) allocation destination based on the NFVI resource information acquired from the VIM 13.

In step S107, the NFVO 11 sends a VNF generation permission in which the determined virtual machine (VM) allocation destination (a VM allocation destination ID) and an identifier of the VIM at the allocation destination (a VIM ID) are set as an acknowledgement (ACK) in response to the VNF generation permission request sent from the VNFM 12 in step S103.

In step S108, the VNFM 12 sends a resource allocation request to the VIM 13 (Allocate Resources). In this step, the VNFM 12 requests the VIM 13 to generate and start a virtual machine (VM) at the allocation destination (the allocation destination indicated by the VM allocation destination ID) designated by the NFVO 11.

In step S109, the VIM 13 generates and starts a virtual machine (VM) and related network resources at the designated allocation destination and sends an acknowledgement (ACK) to the VNFM 12.

In step S110, the VNFM 12 configures a VNF 22 by setting deployment specific parameters.

In step S111, the VNFM 12 uses a VNF lifecycle change notification interface to notify the corresponding EMS 23 that the VNF 22 has been instantiated.

In step S112, the EMS 23 and the VNFM 12 add the instantiated VNF 22 as a managed device.

In step S113, the EMS 23 configures the VNF 22 by setting application specific parameters.

In step S114, the VNFM 12 uses the VNF lifecycle change notification interface to notify the NFVO 11 of the successful instantiation of the VNF 22.

In step S115, the NFVO 11 maps the instantiated VNF 22 to the VIM 13 and a resource pool (positioning of the VNF 22).

As described above, the NFV-MANO 10 according to the first exemplary embodiment, the NFVO 11 collects NFVI resource information from the VIM 13 (steps S104 and S105 in FIG. 5). Next, the NFVO 11 determines an optimum virtual machine (VM) allocation destination based on the collected NFVI resource information (step S106). Next, the NFVO 11 notifies the VNFM 12 of an identifier (a VM allocation destination ID) indicating the virtual machine allocation destination, and the VNFM 12 uses this identifier to send a virtual machine (VM) generation request to the VIM 13 (steps S107 and S108). The VIM 13 generates a virtual machine (VM) at the virtual machine allocation destination determined by the NFVO 11 (step S109).

As a result, even when a VIM 13 implemented based on OpenStack (a VIM that does not have a Promise function) is included in a network system, since the NFVO 11 has a function of determining a virtual machine (VM) allocation destination, optimum allocation of a virtual machine (VM) is enabled in an NFV environment. Namely, when a VNF lifecycle is performed, the VIM 13 that does not have a Promise function (the VIM based on OpenStack) cannot previously reserve allocation of a virtual machine (before the VNFM 12 sends a VM generation request) and notify a reservation ID via an Or-Vi interface. However, even the above VIM 13 that does not have a Promise function can provide the NFVO 11 with NFVI resource information managed by the VIM 13. Thus, the reservation sequence (notification of a reservation ID) between the NFVO 11 and the VIM 13 has been changed so that the NFVO 11 can collect the NFVI resource information and determine a virtual machine (VM) allocation destination.

Second Exemplary Embodiment

Next, a second exemplary embodiment will be described in detail with reference to drawings.

In the first exemplary embodiment, the NFVO 11 determines a virtual machine (VM) allocation destination. However, if the NFVO 11 (or the VIM 13 that has a Promise function) alone determines a virtual machine (VM) allocation destination, since the VNFM 12 cannot designate a flexible deployment rule based on a VNF configuration, inconvenience could occur. Thus, in the second exemplary embodiment, a VNFM 12 that performs optimum allocation of virtual machines (VMs) will be described, assuming that a VIM(s) 13 implemented based on the current OpenStack is used.

Since the network system according to the second exemplary embodiment has the same network system configuration (FIG. 2) and hardware configuration (FIG. 3) as those according to the first exemplary embodiment, description thereof will be omitted.

Figure 6:
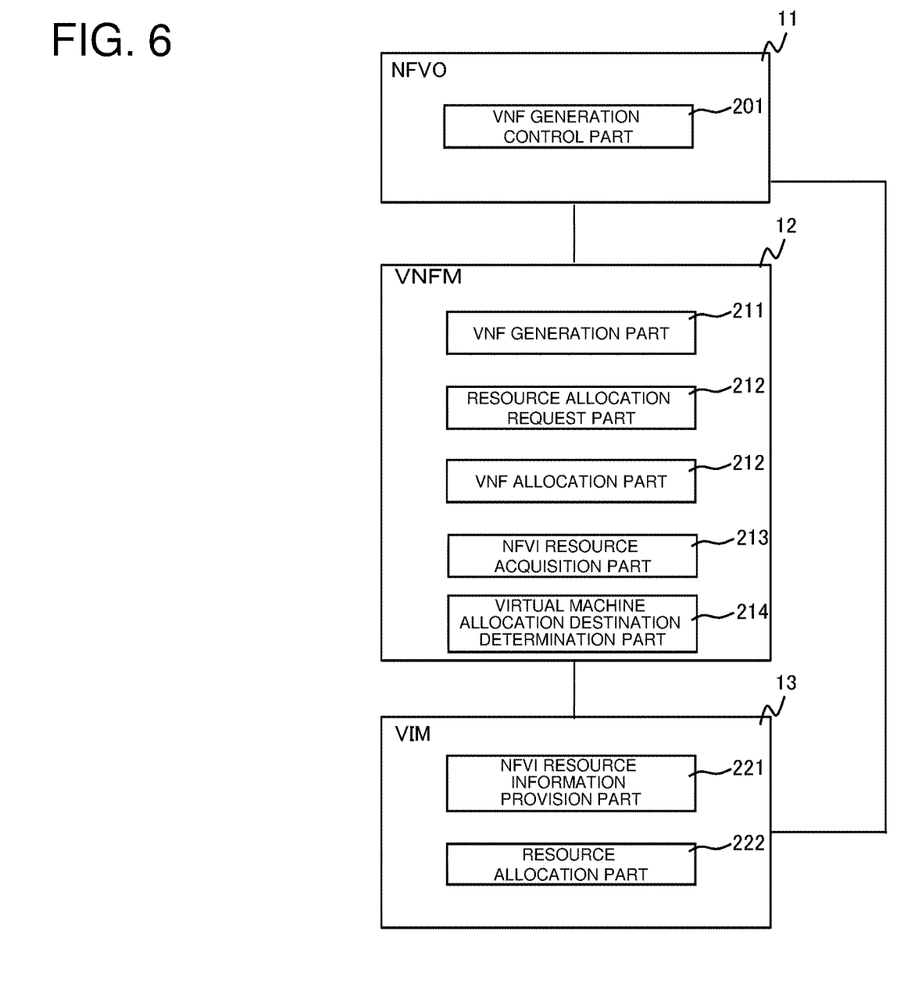
FIG. 6 illustrates functions of an NFV-MANO according to a second exemplary embodiment.

FIG. 6 illustrates functions of an NFV-MANO 10 according to the second exemplary embodiment. FIGS. 4 and 6 are different from each other in that the processing blocks of the NFVI resource acquisition part 202 and the virtual machine allocation destination determination part 203 included in the NFVO 11 are included in the VNFM 12 as an NFVI resource acquisition part 213 and a virtual machine allocation destination determination part 214. Since the basic operations of the processing blocks illustrated in FIGS. 4 and 6 can be the same, detailed description of the processing blocks will be omitted.

Figure 7:
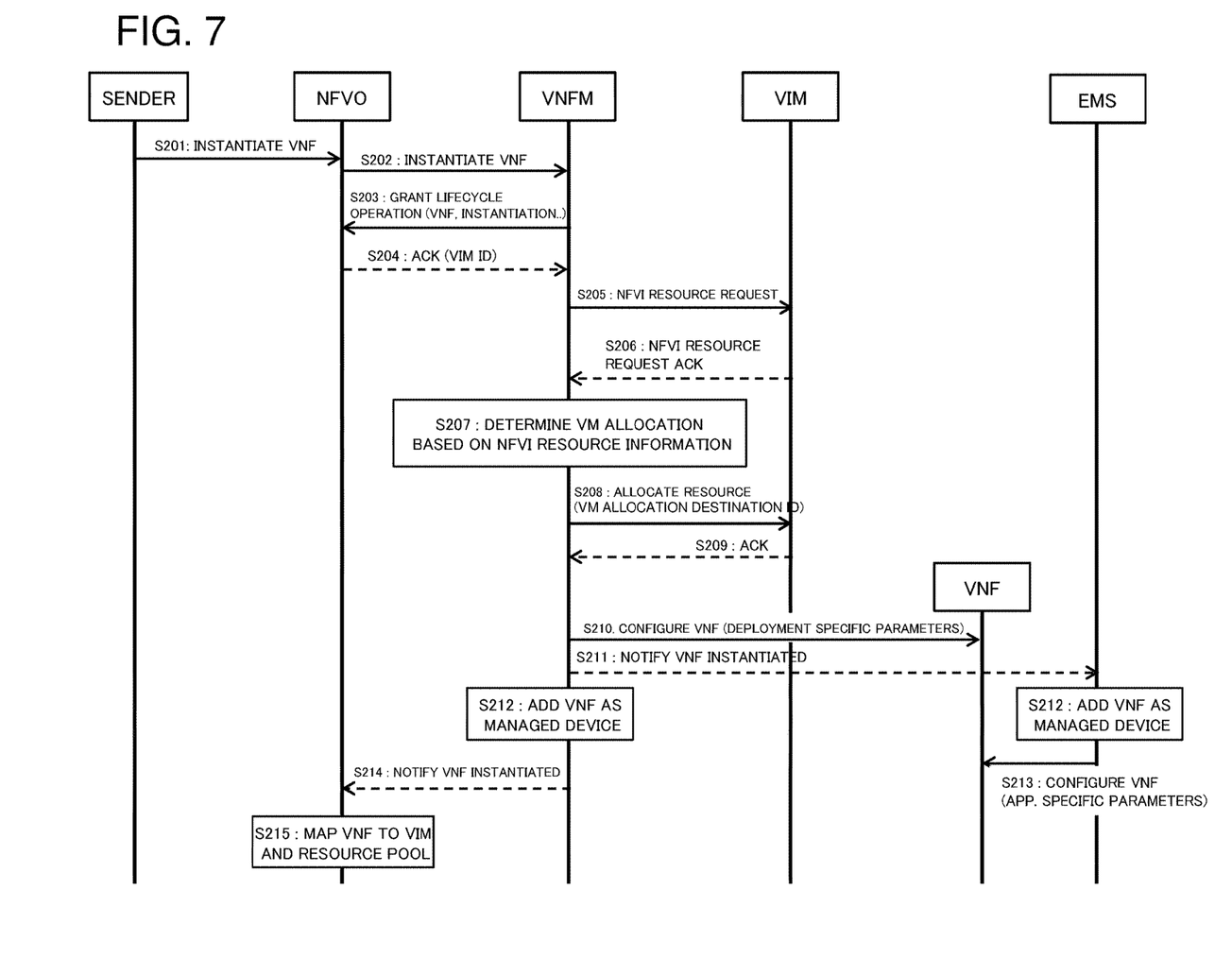
FIG. 7 is a sequence diagram illustrating an example of an operation of a network system according to the second exemplary embodiment.

Next, an operation of the network system according to the second exemplary embodiment will be described with reference to a drawing. FIG. 7 is a sequence diagram illustrating an example of an operation of the network system according to the second exemplary embodiment. An operation of VM allocation performed when a VNF is instantiated in its VNF lifecycle will be described with reference to FIG. 7. FIG. 7 corresponds to FIG. 5 described in the first exemplary embodiment, and steps S101 to S103 in FIG. 5 are the same as steps S201 to S203 in FIG. 7. In addition, steps S108 to S115 in FIG. 5 are the same as steps S208 to S215 in FIG. 7. Thus, description of these steps in FIG. 7 will be omitted.

In step S204, when receiving the VNF generation permission request, in response to the request, the NFVO 11 sends an acknowledgement (ACK) including a VIM identifier to the VNFM 12.

In step S205, the VNFM 12 requests the VIM 13 to send NFVI resource information.

In step S206, by replying to the request from the VNFM 12, the VIM 13 sends NFVI resource information managed thereby to the VNFM 12.

In step S207, the VNFM 12 determines a virtual machine (VM) allocation destination based on the NFVI resource information acquired from the VIM 13. Next, the VNFM 12 sends a resource allocation request including an identifier (a VM allocation destination ID) designating the determined virtual machine (VM) allocation destination to the VIM 13 (step S208).

Variation of Second Exemplary Embodiment

Next, a variation of the second exemplary embodiment will be described.

In both the first and second exemplary embodiments, while the VIM 13 provides NFVI resource information to the upper entities (the NFVO 11 and the VNFM 12). However, with the information granularity based on the current OpenStack, there is a limit to the resource information that can be collected. Specifically, since only the above AZ resource information or PM resource information can be collected and provided, resource information (remaining resource information) that can be used by an individual physical machine (PM) cannot be collected accurately. Thus, strictly speaking, the VNFM 12 cannot perform optimum allocation of a virtual machine(s) (VM(s)) in consideration of the remaining resource information about an individual physical machine (PM). Therefore, as a variation of the second exemplary embodiment, optimum allocation of a virtual machine(s) (VM(s)) in consideration of the remaining resource information about an individual physical machine (PM) will be described.

To realize the above optimum allocation of a virtual machine(s) (VM(s)), an upper limit of resources per physical machine 20 (upper limit information about resources) is registered in advance in the VNFM 12. The registered upper limit about resources is handled as static information in NFVI resource information. In addition, since the NFVI resource information collected from an individual VIM 13 changes when a virtual machine (VM) is generated in a physical machine (PM), the NFVI resource information is handled as dynamic information in the NFVI resource information.

The virtual machine allocation destination determination part 214 illustrated in FIG. 6 determines an optimum virtual machine (VM) allocation destination by combining the above two items of information (static information and dynamic information) in the NFVI resource information. For example, the virtual machine allocation destination determination part 214 can calculate remaining resource information about an individual physical machine by subtracting the dynamic information (the amount of resources allocated to a virtual machine) from the static information (the resource upper limit of the physical machine) in the NFVI resource information and allocate a virtual machine (VM) by preferentially selecting a physical machine (PM) having more remaining resources.

Figure 8:
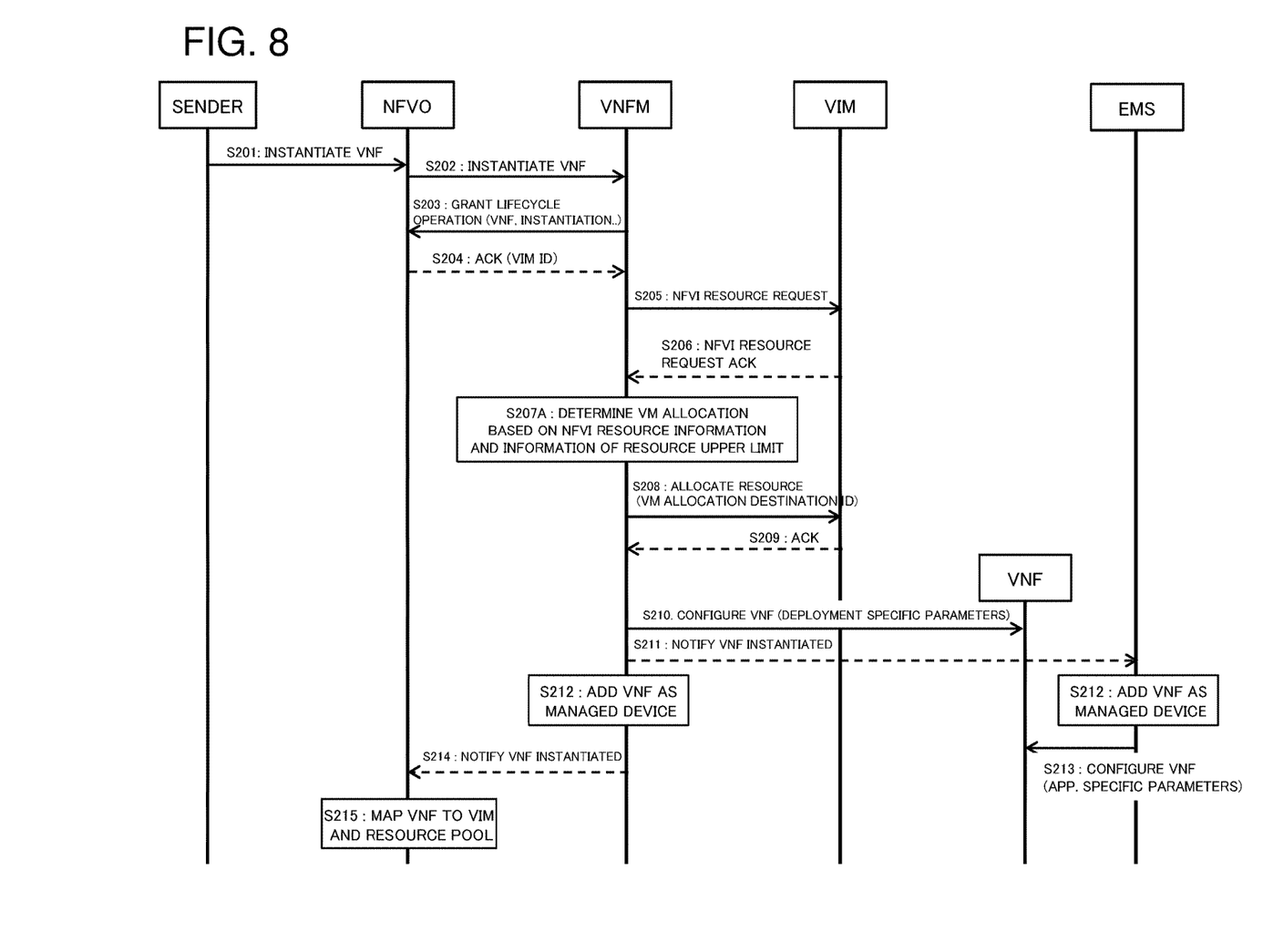
FIG. 8 is a sequence diagram illustrating an operation according to a variation of the second exemplary embodiment.

FIG. 8 is a sequence diagram illustrating an operation according to the variation of the second exemplary embodiment. Since FIGS. 7 and 8 are different from each other only in steps S207 and S207a, which are attributable to the difference of the function of the virtual machine allocation destination determination part 214, the description of FIG. 8 will be omitted. In addition, the operation of the virtual machine allocation destination determination part 214 of the VNFM 12 according to the variation of the second exemplary embodiment can of course be applied to the virtual machine allocation destination determination part 203 of the NFVO 11 according to the first exemplary embodiment. Namely, the NFVO 11 may determine a virtual machine (VM) allocation destination based on the static and dynamic information in the NFVI resource information.

As described above, according to the second exemplary embodiment, the VNFM 12 determines a virtual machine (VM) allocation destination. To this end, the VNFM 12 collects NFVI resource information (steps S205 and S206) and determines an optimum virtual machine (VM) allocation destination by using the collected NFVI resource information (or the upper limit of resources of a physical machine; the variation).

As a result, even when a network system includes a VIM implemented based on OpenStack (a VIM that does not have a Promise function) 13, the VNFM 12 can flexibly allocate a virtual machine (VM) in an NFV environment.

The network systems described in the first and second exemplary embodiments have been used as examples. Namely, the configuration and operation according to the present invention are not limited to those in the above network systems. For example, the virtual machine (VM) allocation destination determination methods described in the first and second exemplary embodiments with reference to FIGS. 5, 7, and 8 may be applied to ScaleOut or Healing in which the VNFM 12 performs allocation of NFVI resources.

In addition, the first exemplary embodiment assumes that the VIM 13 does not perform resource reservation and, depending on the resource allocation timing, the resources (a virtual machine allocation destination) selected by the NFVO 11 could not be allocated when a virtual machine (VM) is generated in step S108. To avoid this inconvenience, the NFVO 11 may notify the VNFM 12 of a plurality of VM allocation destination identifiers (IDs) in step S107 so that the VNFM 12 can designate other resources and performs a retry of transmission of a virtual machine (VM) generation request. Namely, the NFVO 11 calculates a plurality of candidates which could be virtual machine allocation destinations based on the NFVI resource information. Subsequently, the NFVO 11 sends the VM allocation destination IDs corresponding to the calculated candidates (virtual machine allocation destination candidates) to the VNFM 12. The VNFM 12 selects one of the acquired VM allocation destination IDs and sends a virtual machine (VM) generation request to the VIM 13. If the VIM 13 cannot successfully process this request, the VNFM 12 selects another one of the acquired VM allocation destination IDs and sends the selected VM allocation destination ID to the VIM 13. In this way, the VNFM 12 retries transmission of a virtual machine (VM) generation request. Alternatively, the NFVO 11 may notifies the VNFM 12 of a priority order applied when the VNFM 12 selects one of the plurality of identifiers.

Alternatively, the determination of a virtual machine (VM) allocation destination by the upper entity described in the above exemplary embodiments and the determination of a virtual machine (VM) allocation destination by an allocation rule sent from the VNFM 12 to the VIM 13 may be combined with each other. For example, the VNFM 12 may send a VM allocation destination ID and an allocation rule to the VIM 13 (the NFVO 11 may notify the VNFM 12 of the VM allocation destination ID and the allocation rule on a single signal). In this case, if the VIM 13 cannot generate a virtual machine (VM) at the allocation destination indicated by the VM allocation destination ID, the VIM 13 may generate a virtual machine (VM) in accordance with the allocation rule. As described above, by sending an allocation rule including a rule (Filter rule) for filtering the virtual machine (VM) allocation destinations to the VIM 13 and combining the rules and the designation of a virtual machine (VM) allocation destination from the upper entity to the VIM 13, specific allocation of a virtual machine (VM) can be designated. Namely, use of both a VM allocation destination ID and an allocation rule can achieve virtual machine (VM) allocation optimization based on coordination with an allocation rule when a virtual machine (VM) is generated.

The above exemplary embodiments assume that the VIM 13 not implemented with a Promise function based on OpenStack is connected to the NFVO 11 and the VNFM 12. However, in practice, a plurality of VIMs are connected to the NFVO 11, etc., and some of the VIMs could have a Promise function while others do not. To accommodate such a situation, it is desirable that the NFVO 11 determine specifications of an individual VIM 13 (presence of a Promise function) and switch (select) necessary processing. Specifically, if a VIM 13 does not have a Promise function, the NFVO 11 performs the above control operation and processing described in the above exemplary embodiments. If a VIM 13 has a Promise function, the NFVO 11 can delegate the virtual machine (VM) allocation to the VIM 13. The determination of a function(s) of a VIM 13 (determination of presence of a Promise function) can be made by various methods. For example, a function(s) of each of a plurality of VIMs 13 may be registered in advance in the NFVO 11. Alternatively, exchange of information (exchange of capabilities) may be performed between the NFVO 11 and the VIM 13.

Processing performed by an individual one of the apparatuses illustrated as an example in FIGS. 4 and 6 can be realized by a computer program that causes a computer mounted on the corresponding apparatus to use its hardware and execute the corresponding processing described above. Namely, a part or all of the individual means may be realized by a program executed by a computer (a processor, etc.), and any means may be used for the individual means, as long as the means executes a function performed by the corresponding processing module described above by using hardware and/or software of any kind.

The above exemplary embodiments can partially or entirely be described but not limited to as follows.
[Mode 1]
See the network function virtualization management and orchestration apparatus according to the above first aspect.
[Mode 2]
The network function virtualization management and orchestration apparatus preferably according to mode 1,
wherein the upper entity(ies) requests the VIM(s) to provide the resource information about the NFVI(s), and
wherein the VIM(s) provides the resource information about the NFVI(s) to the upper entity(ies) by replying to the request(s).
[Mode 3]
The network function virtualization management and orchestration apparatus preferably according to mode 1 or 2,
wherein the upper entity(ies) previously holds upper limit information about resources of a physical machine(s) as a virtual machine allocation destination(s) and determines virtual machine allocation destination(s) based on the upper limit information and the resource information about the NFVI(s).
[Mode 4]
The network function virtualization management and orchestration apparatus preferably according to any one of modes 1 to 3,
wherein the upper entity(ies) notifies the VIM(s) of an identifier(s) which designates the determined virtual machine allocation destination(s).
[Mode 5]
The network function virtualization management and orchestration apparatus preferably according to mode 1,
wherein the upper entity(ies) is an NFV-Orchestrator (NFVO) which realizes a network service(s) on the NFVI(s).

[Mode 6]
The network function virtualization management and orchestration apparatus preferably according to mode 5, further comprising:
a VNF manager (VNFM) which manages a lifecycle(s) of the VNF(s), and
wherein the NFVO sends an identifier(s) which designates the determined virtual machine allocation destination(s) to the VNFM, and
wherein the VNFM sends a virtual machine resource allocation request(s) which includes the sent identifier(s) to the VIM(s).
[Mode 7]
The network function virtualization management and orchestration apparatus preferably according to mode 6,
wherein the NFVO calculates a plurality of candidates as the virtual machine allocation destination(s) and sends the identifier(s) which corresponds to the plurality of candidates that has been calculated to the VNFM, and
wherein the VNFM selects an identifier(s) to be sent to the VIM(s) from the plurality of identifiers which have been sent.
[Mode 8]
The network function virtualization management and orchestration apparatus preferably according to mode 1,
wherein the upper entity(ies) is a VNF manager (VNFM) which manages a lifecycle(s) of the VNF(s).
[Mode 9]
See the network function virtualization management and orchestration method according to the above second aspect.
[Mode 10]
See the program according to the above third aspect.
Modes 9 and 10 can be expanded in the same way as mode 1 is expanded to modes 2 to 8.

The disclosure of the above NPL cited is incorporated herein by reference thereto. Variations and adjustments of the exemplary embodiments and the examples are possible within the scope of the overall disclosure (including the claims) of the present invention and based on the basic technical concept of the present invention. Various combinations and selections of various disclosed elements (including the elements in the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST

10, 100 NFV-MANO
11 NFVO (NFV Orchestrator)
12 VNFM (VNF Manager)
13, 101 VIM (Virtualized Infrastructure Manager)
14 NS catalog
15 VNF catalog
16 NFV instances repository
17 NFVI resources repository
20 physical machine
21 NFVI
22 VNF
23 EM (EMS)
30 OSS/BSS 51 CPU
52 memory
53 I/O interface
54 NIC
102 upper entity
201 VNF generation control part
202, 213 NFVI resource acquisition part
203, 214 virtual machine allocation destination determination part
211 VNF generation part
212 resource allocation request part
221 NFVI resource information provision part
222 resource allocation part

The invention claimed is:

1. A network function virtualization management and orchestration apparatus, comprising:
at least one processor and memory;
at least one virtualized infrastructure manager (VIM) which performs resource management and control of at least one network function virtualization infrastructure (NFVI) that provides at least one execution infrastructure for at least virtual network function (VNF) implemented and virtualized by software that operates on at least one virtual machine; and
at least one upper entity associated with the at least one VIM,
wherein the at least one upper entity collects resource information about the at least one NFVI from the at least one VIM and determines an optimal virtual machine allocation destination based on the collected resource information, the resource information including static information and dynamic information, and
wherein the at least one VIM generates the at least one virtual machine at the determined optimal virtual machine allocation destination.

2. The network function virtualization management and orchestration apparatus according to claim 1,
wherein the at least one upper entity requests the at least one VIM to provide the resource information about the at least NFVI, and
wherein the at least one VIM provides the resource information about the at least one NFVI to the at least one upper entity by replying to the at least request.

3. The network function virtualization management and orchestration apparatus according to claim 1,
wherein the at least one upper entity stores the static information, and
wherein the static information includes upper limit information about resources of at least one physical machine at the optimal virtual machine allocation destination.

4. The network function virtualization management and orchestration apparatus according to claim 1,
wherein the at least one upper entity notifies the at least one VIM of an identifier which designates the optimal virtual machine allocation destination.

5. The network function virtualization management and orchestration apparatus according to claim 1,
wherein the at least upper entity is an NFV-Orchestrator (NFVO) which realizes at least one network service on the at least one NFVI.

6. The network function virtualization management and orchestration apparatus according to claim 5, further comprising:
a VNF manager (VNFM) which manages at least one lifecycle of the at least one VNF,
wherein the NFVO sends an identifier which designates the optimal virtual machine allocation destination to the VNFM, and
wherein the VNFM sends at least one virtual machine resource allocation request which includes the sent identifier to the at least VIM.

7. The network function virtualization management and orchestration apparatus according to claim 6,
wherein the NFVO calculates a plurality of candidates as virtual machine allocation destination and sends a plurality of identifier which correspond to the plurality of candidates that have been calculated to the VNFM, and
wherein the VNFM selects at least one identifier to be sent to the at least one VIM from the plurality of identifiers which have been sent.

8. The network function virtualization management and orchestration apparatus according to claim 1,
wherein the at least one upper entity is a VNF manager (VNFM) which manages at least one lifecycle of the at least one VNF.

9. A network function virtualization management and orchestration method performed in a network function virtualization management and orchestration apparatus, including at least one processor and memory, and at least one virtualized infrastructure manager (VIM) which performs resource management and control of at least one network function virtualization infrastructure (NFVI) that provides at least one execution infrastructure for at least one virtual network function (VNF) implemented and virtualized by software that operates on at least one virtual machine, the method comprising steps of:
collecting resource information about the at least one NFVI from the at least one VIM;
determining an optimal virtual machine allocation destination based on the collected resource information about the NFVI(s), the resource information including static information and dynamic information; and
generating the at least one virtual machine at the determined optimal virtual machine allocation destination.

10. A non-transitory computer-readable recording medium storing a program, causing a computer in a network function virtualization management and orchestration apparatus, including at least one processor and memory, at least one virtualized infrastructure manager (VIM) which performs resource management and control of at least one network function virtualization infrastructure (NFVI) that provides at least one execution infrastructure for at least one virtual network function (VNF) implemented and virtualized by software that operates on at least one virtual machine, to perform processing for:
collecting resource information about the at least one NFVI from the at least one VIM;
determining an optimal virtual machine allocation destination based on the collected resource information about the NFVI(s), the resource information including static information and dynamic informaton; and
generating at least one virtual machine at the determined optimal virtual machine allocation destination.

* * * * *

UNITED STATES PATENT AND TRADEMARK OFFICE
CERTIFICATE OF CORRECTION

PATENT NO. : 10,719,348 B2
APPLICATION NO. : 16/079249
DATED : July 21, 2020
INVENTOR(S) : Zembutsu et al.

It is certified that error appears in the above-identified patent and that said Letters Patent is hereby corrected as shown below:

In the Specification

Column 7, Preferred Modes, Line 1; After "machine", insert --20--

Column 8, Preferred Modes, Line 10; Delete "OpenS tack," and insert --OpenStack,-- therefor Column 13, Preferred Modes, Line 3; Delete "OpenS tack" and insert --OpenStack-- therefor In the Claims Column 15, Line 22; In Claim 1, after "least", insert --one--

Column 15, Line 40; In Claim 2, after "least", insert --one--

Column 15, Line 43; In Claim 2, after "least", insert --one--

Column 15, Line 58; In Claim 5, after "least", insert --one--

Column 16, Line 6; In Claim 6, after "least", insert --one--

Column 16, Line 11; In Claim 7, delete "destination" and insert --destinations-- therefor

Column 16, Line 12; In Claim 7, delete "identifier" and insert --identifiers-- therefor Column 16, Line 47; In Claim 10, after "memory,", insert --and--

Column 16, Line 61; In Claim 10, delete "informaton;" and insert --information;-- therefor Column 16, Line 62; In Claim 10, after "generating", insert --the--

Signed and Sealed this
Twenty-fourth Day of November, 2020

Andrei Iancu
*Director of the United States Patent and Trademark Office*